Feb. 17, 1959  R. D. EYKAMP  2,873,779
BALED HAY CHOPPER

Filed June 21, 1956  2 Sheets-Sheet 1

INVENTOR.
R. D. Eykamp
BY Arthur A. Sturges
Attorney

Feb. 17, 1959   R. D. EYKAMP   2,873,779
BALED HAY CHOPPER
Filed June 21, 1956   2 Sheets-Sheet 2
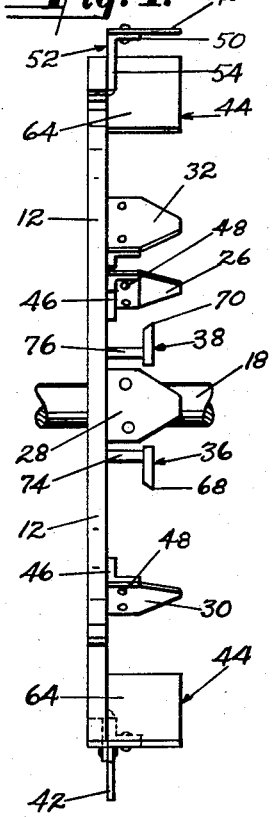
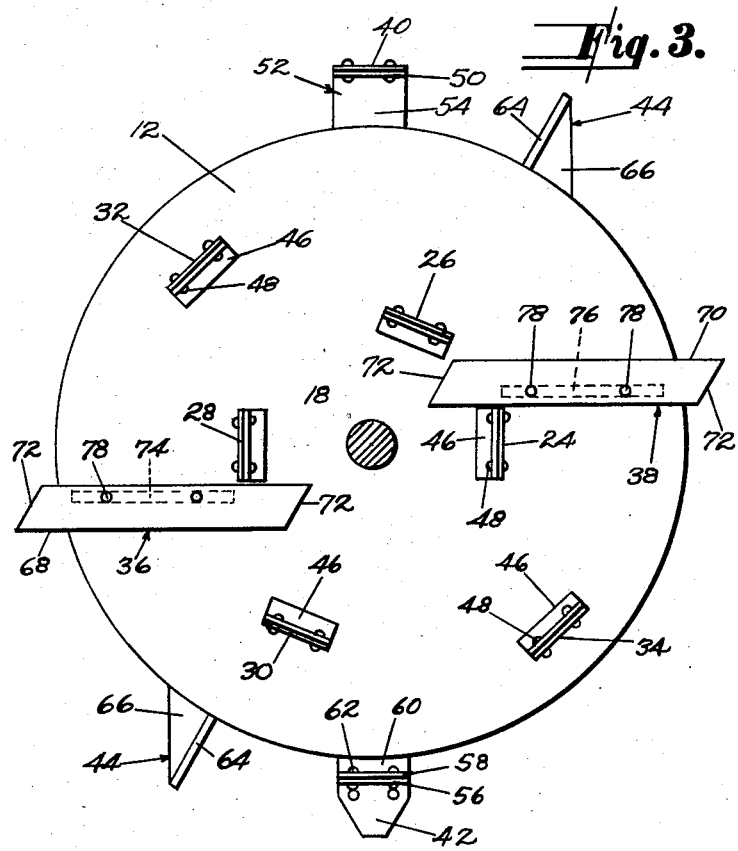
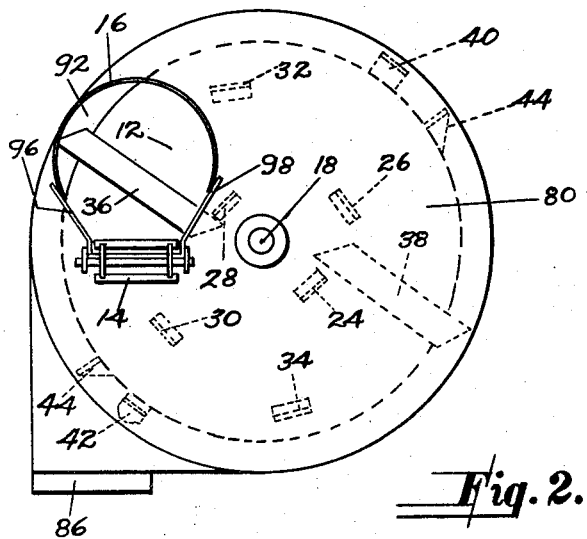
INVENTOR.
R. D. Eykamp
BY Arthur H. Sturges
Attorney

United States Patent Office 2,873,779
Patented Feb. 17, 1959

2,873,779

BALED HAY CHOPPER

Roy D. Eykamp, Lake Preston, S. Dak.

Application June 21, 1956, Serial No. 592,886

3 Claims. (Cl. 146—107)

This invention relates to comminuting devices such as used for forage, and in particular machines for chopping round bales of hay to reduce hay of round bales to chopped forage so that it is adapted to be used for feed for cattle and other stock.

The purpose of this invention is to provide an improved chopping element with which knives in different positions chop forage products particularly in compressed packages, such as round bales of hay, into separated short lengths suitable for feed.

Various types of chopping machines have been provided for reducing hay, fodder, and other products to forage, however, such machines will not chop round bales of hay, and because the hay of a round bale is compressed in layers it is difficult to separate the hay so that it is suitable for forage. Furthermore, conventional choppers for this use, employ spaced radially disposed cutting blades mounted on a disc and extended from the center to the periphery, and it is difficult to efficiently reduce hay and other products to forage with blades arranged in this manner. Also, it is not only difficult, but substantially impossible to cut round bales of hay with radially disposed blades.

With this thought in mind this invention contemplates a chopping element including short cutting blades positioned in a spiral pattern and mounted on the face of a disc in combination with oppositely disposed straight cutting elements parallel to the face of the disc and spaced therefrom, a housing in which the disc with the cutting blades thereon is rotatably mounted, and with means for feeding round bales of hay and the like to the disc and also means for rotating the disc and actuating the feeding means.

The object of this invention is, therefore, to provide chopping means for reducing hay and other products to forage in which the device is adapted to handle round bales of hay.

Another object of the invention is to provide a forage chopping machine in which products are reduced to small particles by short chopping blades positioned in a spiral on a mounting disc.

Another important object of the invention is to provide an improved chopping element in which blades are mounted to cut with a slicing action.

It is yet another object of the invention to provide a chopping element that is particularly adapted for shredding bales of hay, which is also adapted for shredding loose hay and the like.

A further object of the invention is to provide a device for comminuting forage products, and particularly round bales of hay in which the device discharges the final product into a suitable receiver.

A still further object of the invention is to provide a forage comminuting machine, particularly adapted for shredding round bales of hay in which the machine is of a simple and economical construction.

With these and other objects and advantages in view the invention embodies a disc having short cutting blades positioned in a regular Archimedean spiral on the face thereof with straight cutting blades positioned in parallel planes on opposite sides of the center and with horizontal and vertically disposed blades and paddles extended from the periphery, a housing for the disc, means for feeding forage products to the disc, and means for operating the disc and feeding elements.

Other features and advantages of the invention will appear from the following description taken in connection with the drawings, wherein:

Figure 2 is an end elevational view of the machine.

Figure 3 is a view looking toward the face of the chopping disc showing the cutting elements, and with the parts shown on an enlarged scale.

Figure 4 is a side elevational view of the chopping disc.

Figure 1:
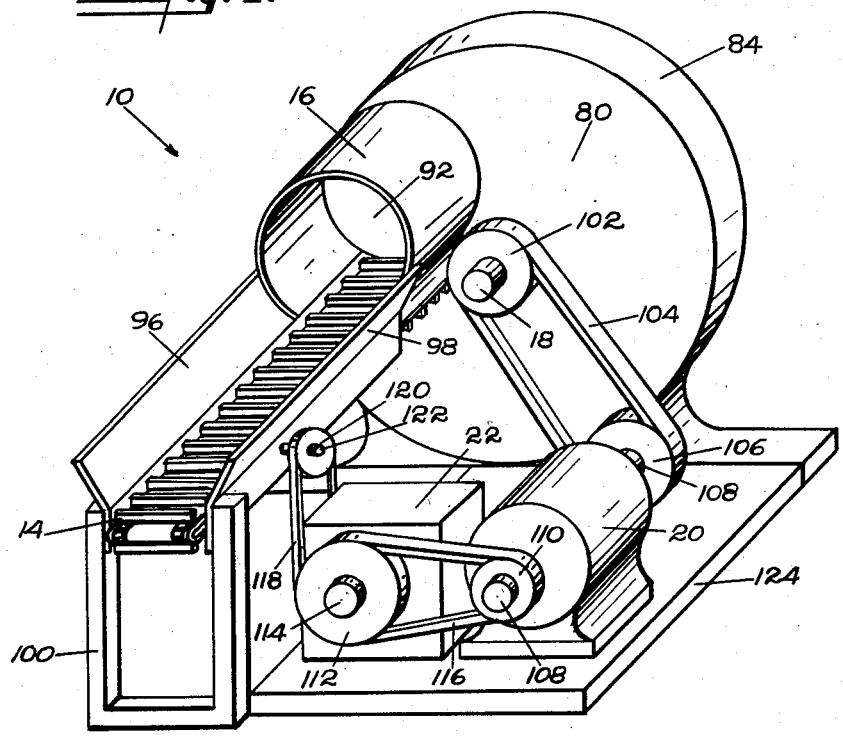
Figure 1 is a view showing the general arrangement of the parts of the baled hay chopping machine.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a chopping disc, numeral 14 a conveyor for feeding products to the disc, numeral 16 a guide for feeding materials from the conveyor to the disc, numeral 18 a shaft upon which the disc is mounted, numeral 20 a motor for driving the disc and conveyor, and numeral 22 a transmission positioned between the motor and conveyor for reducing the speed of the conveyor.

The face of the chopping disc 12 is provided with short cutting blades 24, 26, 28 and 30, which are tangentially positioned and arranged in a spiral, outer blades 32 and 34, and long cutting blades 36 and 38 which are positioned in spaced parallel planes and the planes are located on opposite sides of the center of the disc. The disc is also provided with a tangentially disposed cutting blade 40 and a radially disposed blade 42, both of which extend beyond the periphery and are mounted on the face of the disc, and the face of the disc is also provided with paddles 44 that extend beyond the periphery.

The short cutting blades 24, 26, 28, 30, 32, and 34 are mounted on the face of the disc with angle bars 46 to which the blades are secured by fasteners, such as the rivets 48, and the angle bars are secured to the face of the disc, such as by welding. The blade 40 is secured to a short arm 50 of an angle bar 52 and the long leg 54 of the angle bar is secured to the disc, such as by welding. The base of the blade 42 is provided with a flange 56 which is secured to a flange 58 of an angle bar 60 by rivets 62 and the angle bar 60 is secured to the disc. The paddles 44 are L-shaped in cross section having outwardly extended flanges 64 supported with diagonally positioned bracing webs 66.

The long blades 36 and 38, which are provided with sharp edges 68 and 70 and beveled ends 72 are mounted on supports 74 and 76 with pins 78, and with these blades spaced from the face of the disc the sharp edges will shave hay from the face of a round bale as the disc is rotated.

Figure 5:
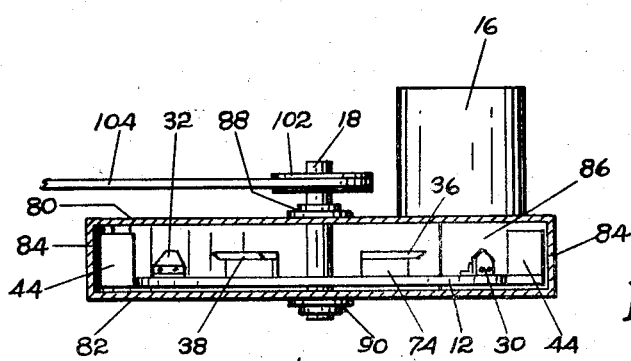
Figure 5 is a sectional plan through the chopping chamber showing the arrangement of the blades and with parts shown in elevation.

The chopping disc 12 is positioned in a housing having end plates 80 and 82 connected by a cylindrical section 84 from which a discharge chimney or opening 86 extends, and the shaft 18, upon which the disc is mounted, is rotatably mounted in bearings 88 and 90 in the end plates, as shown in Figure 5. The end plate 80 is provided with a receiving opening 92 from which a cylindrical guide housing 16 extends, and the conveyor 14, which is provided with diverging side plates 96 and 98, extends through the housing 16, as shown in Figure 1. The conveyor may be manually actuated or power driven, as may be desired. The extended end of the conveyor is supported by U-shaped brackets 100 and the opposite end is mounted on the end plate 80.

The shaft 18 is provided with a pulley 102 over which a belt 104 is trained, and the opposite end of the belt is trained over a pulley 106 on the shaft 108 of the motor 20 whereby the disc is rotated at relatively high speed. The opposite end of the motor shaft is provided with a pulley 110 which is aligned with a pulley 112 on a shaft 114 of the transmission 22, and a belt 116 is trained over the pulleys 110 and 112. The conveyor 14 may be driven by a belt 118 trained over a pulley 120 on a shaft 122 and also over a similar pulley on the transmission.

The parts are mounted on a base or platform 124 and products deposited upon the conveyor are carried to the chopping disc which shreds or comminutes hay, particularly in round bales reducing the same to forage for feed for cattle and other stock.

The cutting blades, which are similar to the knives of a sickle bar of a mower, and which include base portions with converging sharp cutting edges, are positioned tangent to an arc described with a radius on the center of the disc and with the blades positioned in a spiral a slicing action is obtained.

Operation

With the parts positioned as illustrated and described bales of hay and particularly round bales, and also other products, are supplied to the conveyor manually or by gravity whereby the products are fed toward the guide or housing 16 and through the housing to the chamber 84 in which the cutting or chopping disc is positioned, and upon engaging the fast rotating disc the cutting blades chop the hay or other products into small pieces, which are discharged through the cutter into a grinder or suitable container.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. In a baled hay chopper, the combination which comprises a horizontally disposed shaft, means for rotatably mounting the shaft, a vertically positioned disc mounted on the shaft, one side of the disc providing a face, a pair of long cutting blades mounted on the face of the disc and positioned in spaced parallel relation thereto, the long cutting blades being in spaced parallel planes and said planes being on opposite sides of the axis of the disc and spaced equidistantly from said axis, tangentially disposed short cutting blades also mounted on the face of the disc and arranged in a spiral, the cutting edges of the short cutting blades being in a plane parallel to and spaced from the face of the disc and said plane being the same as that in which the long cutting blades are positioned, a tangentially disposed short cutting blade also mounted on the face of the disc and extended beyond the periphery thereof, a radially disposed blade mounted on the face of the disc and extended from the periphery of the disc, and oppositely disposed paddles mounted on the face of the disc and extended from the periphery thereof.

2. A baled hay chopper as described in claim 1, in which means is provided for feeding material to the chopping blades of the disc.

3. In combination with a baled hay chopper as described in claim 1, a motor operatively connected to the shaft for rotating the shaft and disc, and a conveyor for feeding material to the disc.

References Cited in the file of this patent

UNITED STATES PATENTS

| | | |
|---|---|---|
| 613,668 | Dick | Nov. 8, 1898 |
| 2,605,800 | Mateu | Aug. 5, 1952 |